United States Patent [19]

Mundy et al.

[11] 3,956,619

[45] May 11, 1976

[54] PIPELINE WALSH-HADAMARD TRANSFORMATIONS

[75] Inventors: Joseph L. Mundy, Schenectady; Reuben E. Joynson, Alplaus, both of N.Y.

[73] Assignee: General Electric Company, Schenectady, N.Y.

[22] Filed: Mar. 31, 1975

[21] Appl. No.: 563,820

[52] U.S. Cl. .............................. 235/156; 235/197
[51] Int. Cl.[2] ...................... G06F 7/38; G06F 15/34
[58] Field of Search ........... 235/193, 152, 156, 197; 179/15 BC; 328/167

[56] References Cited
UNITED STATES PATENTS

| 3,742,201 | 6/1973 | Groginsky | 235/156 |
| 3,754,128 | 8/1973 | Corinthios | 235/156 |
| 3,775,602 | 11/1973 | Alexandriois et al. | 235/156 |
| 3,792,355 | 2/1974 | Miyata et al. | 179/15 BC |
| 3,821,527 | 6/1974 | Kang | 235/152 |

*Primary Examiner*—Joseph F. Ruggiero
*Attorney, Agent, or Firm*—Jack E. Haken; Joseph T. Cohen; Jerome C. Squillaro

[57] ABSTRACT

A machine for generating sequency ordered Walsh transform coefficients from an input data sequence comprises an ordered cascade of identically configured signal processor modules. Each module receives two sequency ordered transform blocks of Walsh transform co-efficients and by alternately adding and subtracting corresponding elements in those blocks produces the transform co-efficients of next higher order.

21 Claims, 16 Drawing Figures

8 POINT HADAMARD PIPELINE TIMING DIAGRAM

| CYCLE | I | II | III | IV | V | VI | VII | VIII | IX | X | XI | XII | XIII | XIV | XV | XVI | XVII | XVIII |
|---|---|---|---|---|---|---|---|---|---|---|---|---|---|---|---|---|---|---|
| WRITE INTO STORAGE 104 (ADDRESS) | a | b | a | b | a | b | a | b | a | b | a | b | a | b | a | b | a | b |
| WRITE INTO STORAGE 108 | (1) | 0 | − | 0 | − | 0 | − | 0 | − | 0 | − | 0 | − | 0 | − | 0 | − | 0 |
| ADD–SUBTRACT 110 ($+=Q_0$) | (−) | (+) | (−) | + | − | + | − | + | − | + | − | + | − | + | − | + | − | + |
| WRITE INTO STORAGE 114 (ADDRESS) | (b) | (c) | (d) | a | b | c | d | a | b | c | d | a | b | c | d | a | b | c |
| WRITE INTO STORAGE 120b (FROM) | (114b) | (0) | (114a) | (0) | (114b) | 0 | 114a | 0 | 114b | 0 | 114a | 0 | 114b | 0 | 114a | 0 | 114b | 0 |
| WRITE INTO STORAGE 120b (FROM) | (114d) | (0) | (114c) | (0) | (114d) | 0 | 114c | 0 | 114d | 0 | 114c | 0 | 114d | 0 | 114c | 0 | 114d | 0 |
| ADD–SUBTRACT 122 ($+=Q_1$) | (−) | (−) | (+) | (+) | (−) | (−) | (+) | + | − | − | + | + | − | − | + | + | − | − |
| WRITE INTO STORAGE 126 (ADDRESS) | (b) | (c) | (d) | (e) | (f) | (g) | (h) | a | b | c | d | e | f | g | h | a | b | c |
| WRITE INTO STORAGE 134a (FROM) | (126c) | (0) | (126d) | (0) | (126a) | (0) | (126b) | (0) | (126c) | (0) | (126d) | (0) | 126a | 0 | 126b | 0 | 126c | 0 |
| WRITE INTO STORAGE 134b (FROM) | (126g) | (0) | (126h) | (0) | (126e) | (0) | (126f) | (0) | (126g) | (0) | (126h) | (0) | 126e | 0 | 126f | 0 | 126g | 0 |
| ADD–SUBTRACT 136 ($+=\overline{Q_1}$) | (+) | (+) | (−) | (−) | (+) | (+) | (−) | (−) | (+) | (+) | (−) | (−) | (+) | + | − | − | + | + |
| OUTPUT 138 | * | * | * | * | * | * | * | * | * | * | * | * | * | WAL 0 | WAL 1 | WAL 2 | WAL 3 | WAL 4 |

CLOCK CYCLE IV

CLOCK CYCLE V

CLOCK CYCLE VI

CLOCK CYCLE VII

CLOCK CYCLE VIII

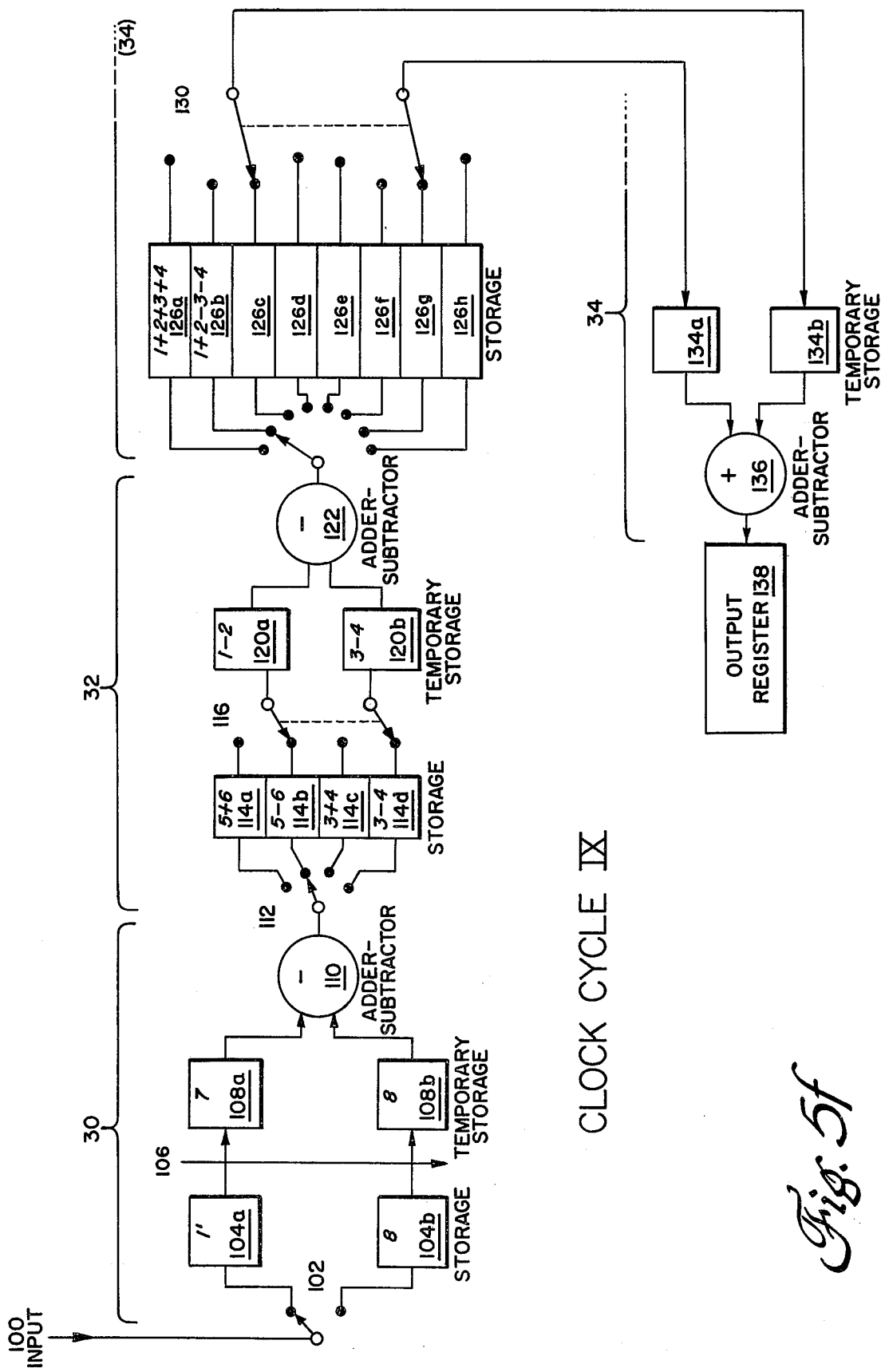

CLOCK CYCLE X

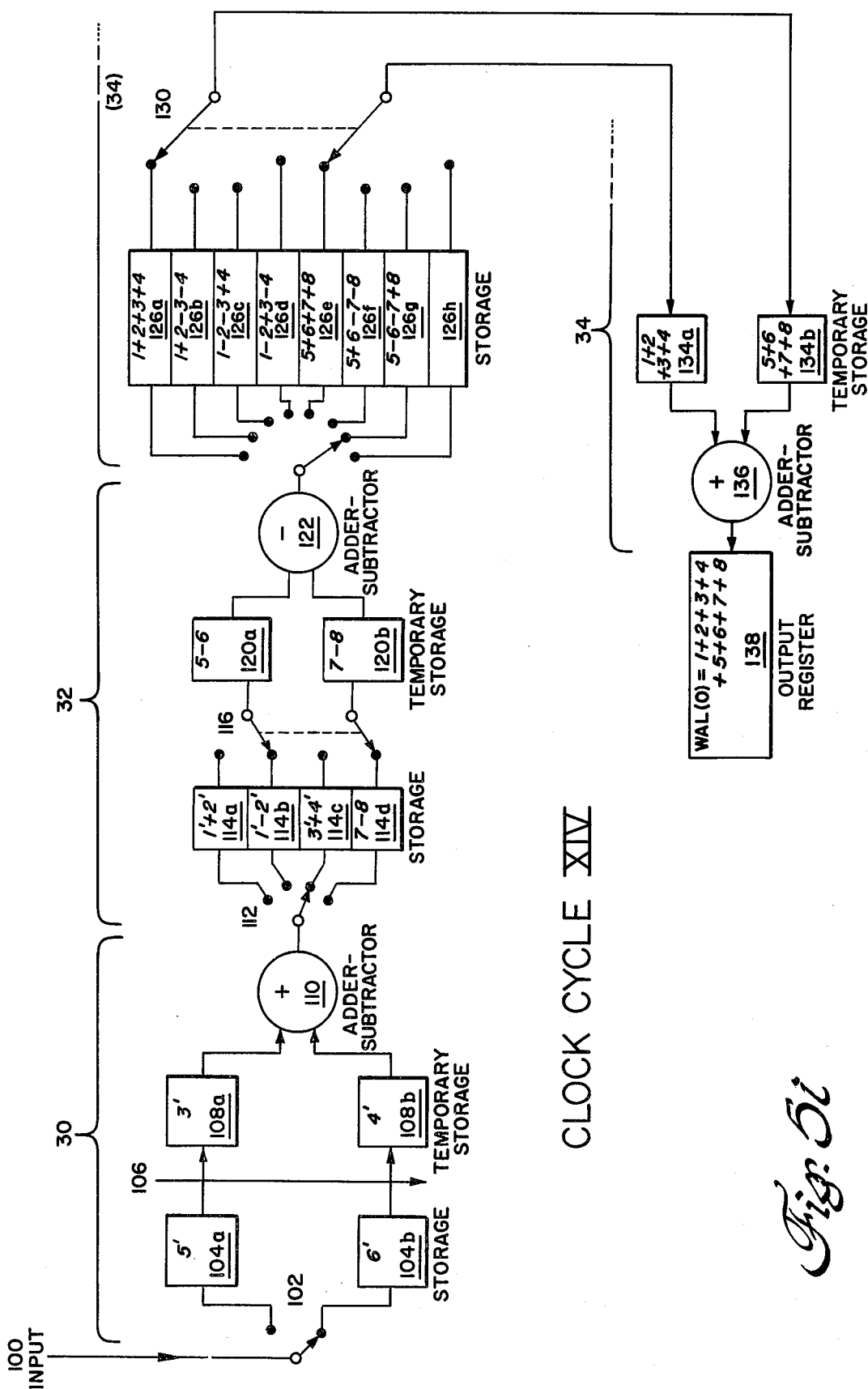

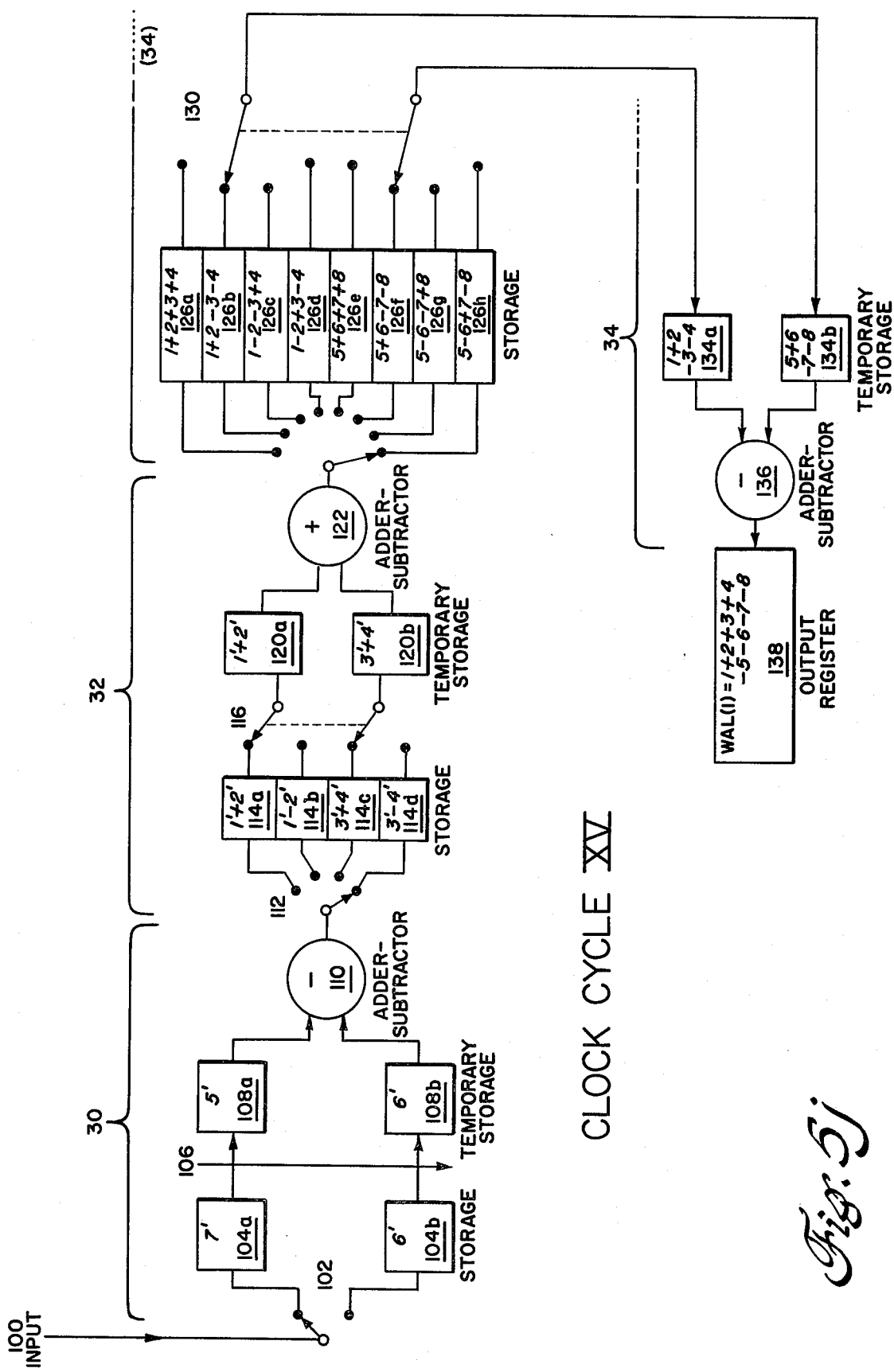

3,956,619

PIPELINE WALSH-HADAMARD TRANSFORMATIONS

BACKGROUND OF THE INVENTION

This invention concerns the extraction of orthogonal transform coefficients from sequences of data. More specifically, this invention concerns processors for extracting sequency ordered, Walsh-Hadamard transform coefficients from serially presented data.

It is well known than any function having finite energy may be expressed as the sum of a series of orthogonal functions. In 1923 Joseph L. Walsh devised a complete set of orthogonal functions, now known as Walsh functions, which are especially useful for the representation of binary waveforms, Walsh functions, which are denoted by the expression $$wal\ (s, t),$$

are binary functions having values of +1 and −1 in the unit interval. The sequency, $s$, of a Walsh function is defined herein as the number of times the value of that function changes sign within the unit interval (the term "sequency" is also used in the literature to denote one-half the number of sign changes in the unit interval). The sequency of a Walsh function may be seen to be somewhat analogous to the frequency of the more common sine or cosine functions.

A series of Walsh functions may be expressed in a matrix, known as a Hadamard matrix, in which elements are either +1 or −1 and in which the respective row vectors and the respective column vectors are mutually orthogonal. The values of the elements in a row or column of a Hadamard matrix represent the values of a Walsh function over sequential segments of the unit interval. Successive examination of the rows or columns of a Hadamard matrix yields a set of Walsh functions which are known as Hadamard functions denoted $$H(n, t).$$

The natural order $n$, of a Hadamard function denotes the order in which that function is generated from a Hadamard matrix in the manner described above which is not the sequency order. Further discussion of the properties of Hadamard and Walsh functions and of algorithms for generating Hadamard matrices may be found in H. G. Harmuth, "Transmission of Information by Orthogonal Functions", Second Edition, Springer-Verlag, 1972.

The Walsh transform vector $w_a$ of a binary function vector $f$ may be expressed in matrix notation as:

$$w_a = [wal]\ \bar{f}_a \qquad (1)$$

where $[wal]$ is a matrix whose rows are sequency ordered Walsh functions. The order of a Walsh transform, as defined herein, means the number of dimensions in the vector $w_a$ which may be seen to equal the rank of the matrix $[wal]$.

Machines for generating the values of Walsh functions are well known in the computing arts. For example, U.S. Pat. No. 3,701,143 to Nacht and U.S. Pat. No. 3,795,864 to Fullton, Jr. describe digital circuits for generating Walsh functions. The Walsh transform of a binary data stream may be generated by performing the above indicated matrix multiplication using the Walsh functions generated by the above referenced circuits and a digital processor; for example see U.S. Pat. No. 3,859,515 to Radcliffe Jr. The process of generating Walsh transforms by direct matrix multiplication requires relatively large amounts of processing hardware and is somewhat time-consuming.

Machines for generating Walsh transforms using the process known as the "fast Hadamard transform" have been described in the prior art literature. These machines, two of which are described in U.S. Pat. Nos. 3,742,201 to Groginski and 3,792,355 to Miyata et al., generally operate in a pipeline mode: that is, a mode in which a sequence of input data is continuously processed to yield a continuous output stream of Walsh transform coefficients. The pipeline transform machines of the prior art act to produce naturally ordered Hadamard transform coefficients: that is, the transform coefficients of the input signal which correspond to matrix multiplication by a Hadamard or natually ordered matrix.

The process of Walsh-Hadamard transformation is especially useful in the conditioning of signals for efficient transmission over communication channels and in the recognition and extraction of information from optical and other imaging systems. Such applications of the Hadamard or Walsh transform are further discussed in the above-cited Harmuth reference and Groginski Patent. In many Walsh-Hadamard transform applications, it is desirable to process the transform coefficients of a binary data stream in a sequency order which has been shown to facilitate the extraction of information.

Prior art pipeline, Walsh-Hadamard transform generators incorporated recognition circuits to identify the sequency of the output transform coefficient signals. Such circuits, for example, those described in the above-referenced Groginski Patent, yielded sequency information for use in processing the output, transform signals but did not, without further storage and accessing means, yield sequency ordered Walsh-Hadamard transform coefficients.

SUMMARY OF THE INVENTION

The present invention concerns a new and distinct configuration for pipeline, Walsh-Hadamard transform coefficient generating circuits. The transform generator of the present invention receives a serial stream of data which is processed in pipeline fashion to yield a stream of sequency ordered, Walsh transform coefficients. The circuits comprises a cascaded series of processor modules, each of which is designed to receive a serial stream of input data and to produce therefrom Walsh transform coefficients of increased order. Thus, the first processor module in the cascade receives a serial input data stream representative of an input signal and, as its output, produces the sequency ordered Walsh transform coefficients of the input data stream taken two bits at a time. The output of the first signal processor module is applied to the input of a second signal processor module. The output of the second signal processor module is a serial stream of Walsh transform coefficients of the original input data stream taken four bits at a time. The output of the second stage may be further processed in a cascaded series of processor module stages, each of which yields as an output a serial stream of sequency ordered Walsh transform coefficients of the original input data stream, where the output of the $p^{th}$ stage of the signal processor module cascade represents sequency ordered, Walsh transform coefficients of order $2^P$ generated from the original input data taken $2^P$ bits at a time.

Each signal processor module of the present invention incorporates storage means for accumulating blocks of lower order Walsh transform coefficients which are received from the next lowest signal processor module in the cascade. Two blocks of lower order transform coefficients are stored in the module and the correspondingly ordered coefficients from each of the two blocks are alternately added and subtracted to yield the sequency ordered Walsh transform coefficients of the next higher order. Each processor module produces the sums and differences from a first lower order transform coefficient pair followed by the differences and sums from a following lower order transform pair to produce higher order Walsh transform coefficients in sequency order.

Any number, $p$, of signal processor modules may be combined in cascade to produce sequency ordered Walsh transform coefficients from blocks of $2^P$ input data bits. Intermediate outputs may be obtained from each signal processor module within the cascade which are representative of lower order, Walsh transform coefficients generated from the same input data grouped into smaller blocks. The processor modules may operate synchronously under the control of a relatively simple timing clock circuit.

A p stage generator of the present invention requires about $2^{p+1}$ storage locations and $p$ adder-subtractor circuits. This represents a total component savings over many prior art configurations. The generator pipeline fills and first completed transform coefficients appear at its output $2^p + 2p$ clock steps after the first data sample is applied to the input. After the pipeline is full, a steady stream of transform coefficients is available. The beginning of a new transform coefficient block occurs after every $2^P$ timing clock periods. A digital circuit implementation of the present invention is capable of operating at a clock rate which is limited only by the digital logic delay time. Using presently available transistor-transistor logic circuits, clocking rates in excess of 10 MHz are possible.

Hadamard transform pipelines may also be constructed using analog sample-and-hold circuits as the storage means and operational amplifiers as the adding-subtracting means. Such a configuration has been described by Karl and Swartwood, "A Hybrid Walsh Transform Computer", IEEE Trans. Computers, Vol. C-22, p. 669. An analog implementation of the present invention is capable of operation at higher data rates, and with fewer operational amplifiers than the circuit described by Karl and Swartwood. Specifically, Karl's method of transform extraction requires $2^P$ operational amplifiers, whereas a circuit in accordance with the present invention requires only $p$ operational amplifiers. In addition, the input sample rate of the present invention circuit is only limited by the settling time of an individual operational amplifier, whereas that of the Karl circuit is limited by the sum of the settling times of $p$ such operational amplifiers.

It is, therefore, an object of this invention to provide a pipeline Walsh transform generator which produces transform coefficients in sequency order.

Another object of this invention is to provide a pipeline Walsh transform generator which simultaneously yields sequency ordered transform coefficients from input data blocks of increasing order.

Another object of this invention is to provide a pipeline Walsh transform generator which is capable of operation at high speed with fewer electronic components than the circuits of the prior art.

Yet another object of this invention is to describe a pipeline Walsh transform generator which may be constructed using either digital or analog processing components.

BRIEF DESCRIPTION OF THE DRAWINGS

The novel features believed to be characteristic of the present invention are set forth in the appended claims. The invention itself, together with further objectives and advantages thereof, may best be understood with reference to the following detailed description, taken in connection with the appended drawings in which:

FIG. 4 is a chart indicating a timing sequence for operation of the circuit of FIG. 3;

FIGS. 5a–5j schematically represent a sequential flow of information in the pipeline transform generator of FIG. 3 in accordance with the timing diagram of FIG. 4.

DESCRIPTION OF THE PREFERRED EMBODIMENT

Figures 1A, 1B:
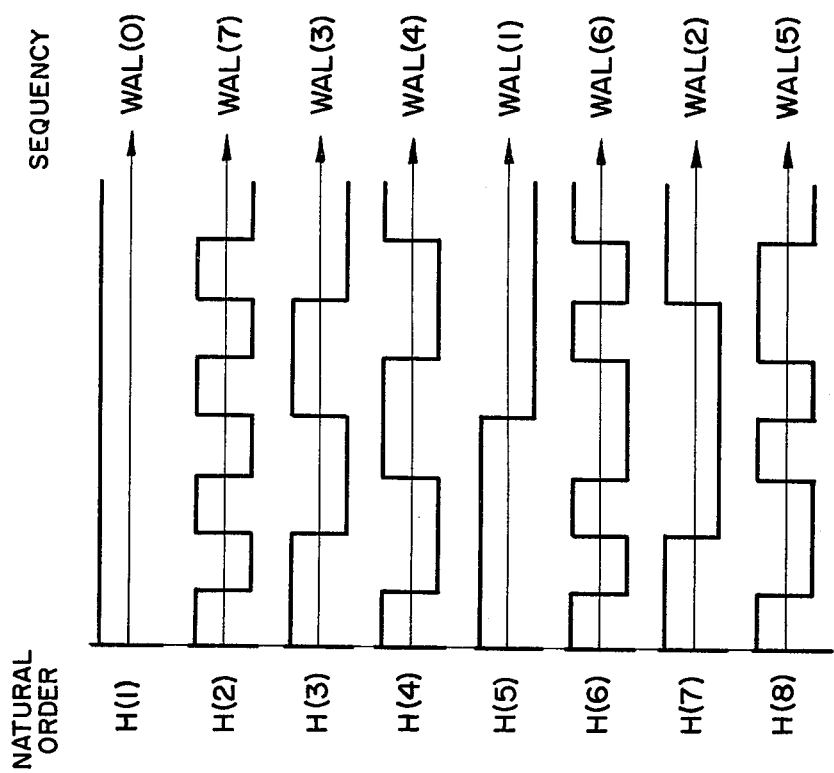
FIG. 1a is a Hadamard matrix of rank 8.
FIG. 1b represents the naturally ordered Walsh functions of order 8.

In accordance with the present invention, a pipeline circuit for generating Walsh transform coefficients from sequential blocks of binary data having a length P, where $P = 2^n$, can be constructed from cascaded, identically configured signal processor modules. By way of illustration, a generator for producing transform coefficients from blocks of eight data units and incorporating three cascaded signal processor module stages is described. It is to be understood that the principles of the present invention are applicable to larger or smaller data blocks containing $P = 2^n$ units and that the principles described in the following description in the following description of the preferred embodiment may be expanded by the addition of cascaded signal processor module stages to perform Walsh transformations on such data blocks.

The components of the circuits and modules which are used in combination to produce the Walsh transform generator of the present invention are well known to the signal processing and computer arts. Therefore, in the following description and in the drawings these components and circuits are referred to in terms of functional blocks rather than by specific circuit descriptions. It is to be understood that machines in accordance with the present invention may be constructed in digital computer form; in which case, the above-mentioned circuit modules may, by way of example, comprise digital registers, core or active memory stages, digital adders, subtractors, multipliers, multiplexers, and other elements well known to the digital computer art. Likewise, machines in accordance with the present invention may be constructed in analog processor form in which case the circuit modules may, for example, comprise analog sample-and-hold circuits, operational sum-and-difference amplifiers, analog multiplexing and switching circuits, and the like. Persons skilled in the art will likewise recognize that a general purpose digital computer may be operated in a manner to simulate the operation of the above-mentioned digital or analog circuit elements; likewise, a suitably connected and programmed analog computer will function in the same manner as the above-described circuit elements and may be used to simulate or operate in the same manner as the above-described machine. It is intended by the present invention to include all such machines as comprise computational modules which, being functionally connected in the topology described below, function to compute pipeline Walsh transforms within the scope of claimed invention.

The purpose and function of the present invention may be understood by reference to FIG. 1a and FIG. 1b which respectively illustrate a Hadamard matrix of rank 8 and set of orthogonal Hadamard functions which may be generated therefrom. The Hadamard matrix of FIG. 1a comprises elements having values of +1 and −1 which are arranged to form mutually orthogonal sets of row and column vectors. If the values of the row vectors of the matrix of FIG. 1a are placed across the unit interval, the Hadamard functions of FIG. 1b are produced. These functions are denoted $H(n)$, wherein $n$ denotes the natural order of the function. It will be seen that the row vectors and column vectors of the Hadamard matrix produce a set of naturally ordered Walsh functions in the unit interval. The sequency $s$, of these Walsh functions, which as defined herein, means the number of times the value of that function changes sign within the unit interval, does not vary monotonically with the natural order of those functions as illustrated in FIG. 1b. If $[Wal]$ represents a matrix, the rows of which comprise the values of naturally ordered Walsh functions, the naturally ordered Walsh transformation $\overline{W}_a$ of a vector $\overline{f}_a$ may be defined by the matrix equation:

$$\overline{W_a(t)} = [Wal]\,\overline{f_a(t)} \qquad (2)$$

Since the values of the elements of a Walsh function matrix are either +1 or −1, the Walsh transform coefficient for a data stream may be generated by affixing to each sample position of $f_a(t)$ the sign of corresponding term $Wal(a, s)$ of the appropriate order Walsh function and summing those signed terms. The transform coefficient generator of the present invention operates on this principle. If the sample positions in an eight sample block of data $\overline{f}_a(t)$ are assigned the indicies $a = 0 \ldots 7$, the sequency ordered Walsh coefficients of order eight of $\overline{f}_a(t)$ are given in Table I.

TABLE I

| Sequency | Walsh Coefficients |
|---|---|
| 0 | $W(0,\overline{f}_a) = f_0 + f_1 + f_2 + f_3 + f_4 + f_5 + f_6 + f_7$ |
| 1 | $W(1,\overline{f}_a) = f_0 + f_1 + f_2 + f_3 - f_4 - f_5 - f_6 - f_7$ |
| 2 | $W(2,\overline{f}_a) = f_0 + f_1 - f_2 - f_3 - f_4 - f_5 + f_6 + f_7$ |
| 3 | $W(3,\overline{f}_a) = f_0 + f_1 - f_2 - f_3 + f_4 + f_5 - f_6 - f_7$ |
| 4 | $W(4,\overline{f}_a) = f_0 - f_1 - f_2 + f_3 + f_4 - f_5 - f_6 + f_7$ |
| 5 | $W(5,\overline{f}_a) = f_0 - f_1 - f_2 + f_3 - f_4 + f_5 + f_6 - f_7$ |
| 6 | $W(6,\overline{f}_a) = f_0 - f_1 + f_2 - f_3 - f_4 + f_5 - f_6 + f_7$ |

TABLE I-continued

| Sequency | Walsh Coefficients |
|---|---|
| 7 | $W(7,\overline{f}_a) = f_0 - f_1 + f_2 - f_3 + f_4 - f_5 + f_6 - f_7$ |

Figure 2:
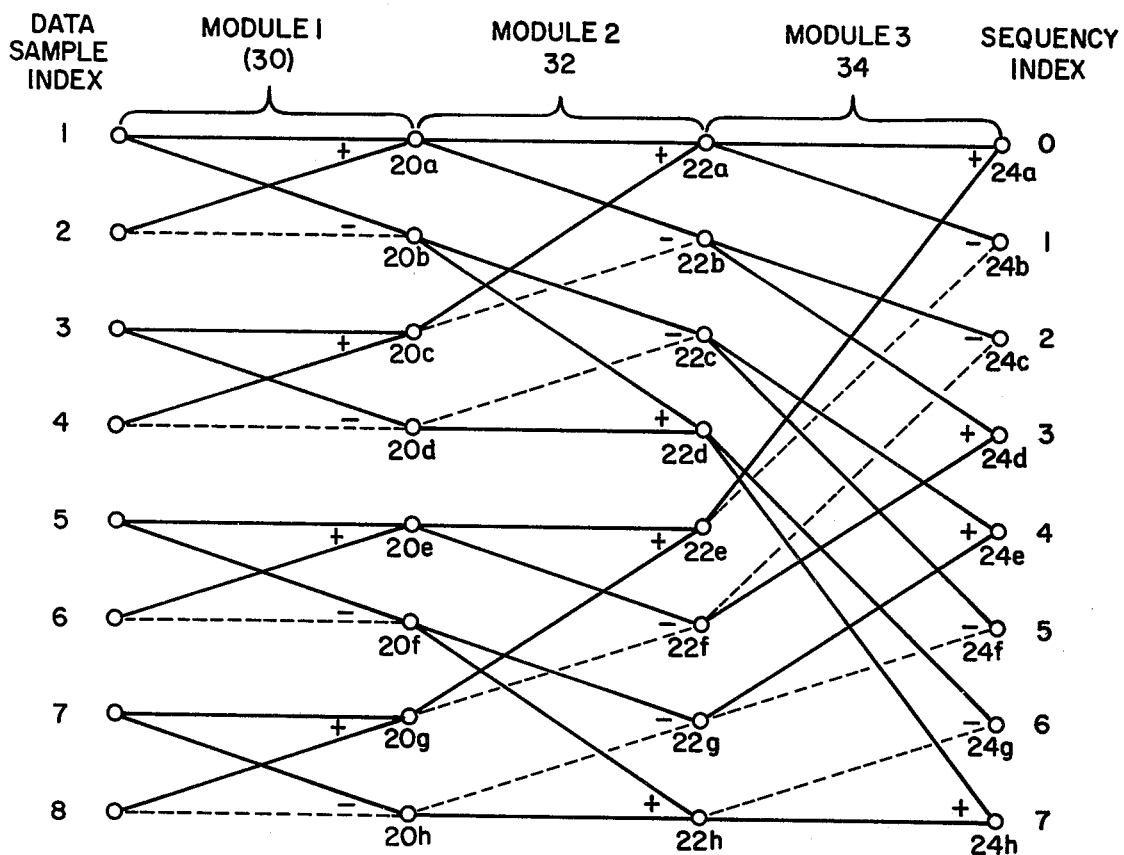
FIG. 2 schematically illustrates the flow of information in a three stage Walsh transform generator of the present invention.

The generator of the present invention produces the Walsh transform coefficients, which are illustrated in Table 1, by utilizing a computation method illustrated schematically in FIG. 2. In the illustration of FIG. 2, solid lines signify taking of the positive value of a data term while dashed lines signify the taking of the negative value of a data term. The nodes of the diagram represent the arithmetic combination of samples from the input data sequence which are produced at the output of each modular processor stage of the pipeline transform generator. Thus, the output of the first module 30 of the generator at node 20a is equal to the sum of data Sample 1 and data Sample 2. Likewise the output of the first module 30 at node 20b of the diagram is equal to the difference of data Sample 2 subtracted from data Sample 1. The respective outputs of the first module 30 at the nodes 20c through 20h are likewise generated by taking the sums and differences of data Samples 3 and 4, 5 and 6, and 7 and 8.

These sums and differences are then combined in a second module 32 to yield the arithmetic terms illustrated at the nodes 22a through 22h. The arithmetic term generated at the node 22a is equal to the sum of those terms at node 20a (Sample 1 plus Sample 2) and those at node 20c (Sample 3 plus Sample 4). Likewise the arithmetic term generated at node 22b is equal to the term at node 20c subtracted from the term at node 20a, (Sample 1 plus Sample 2 minus Sample 3 minus Sample 4). As indicated in FIG. 2, the terms at nodes 22a through 22h are generated by sequentially combining the first term (20a) which is produced from the first data pair (Sample 1 and Sample 2) with the first term (20c) which is produced from the combination of the second data pair (Sample 3 and Sample 4). The computation of terms in the second module 32 proceeds by sequential combination of like indexed outputs of the first data module 30 in a sequentially alternating order of additions and subtractions: that is, the arithmetic operations in the second module 32 proceed in the order +, −, −, +, + . . . .

The outputs of the second module 32, which are illustrated at nodes 22a through 22h of FIG. 2 are processed in a third module 34, which performs the same data manipulation operations as the second module, to yield the outputs which are illustrated at nodes 24a through 24h. Thus, the terms at node 22a and node 22e are summed to yield the output at node 24a, while their difference is taken to yield the output at node 24b. The outputs at nodes 24a through 24h may be seen to be identical with the sequency ordered Walsh transform coefficients listed in Table 1. Walsh transform coefficients of higher order, $r = 2^n$, may be generated by extending the diagram of FIG. 2 to include additional cascaded modules which are identical, in function, to the modules 32 and 34.

Figure 3:
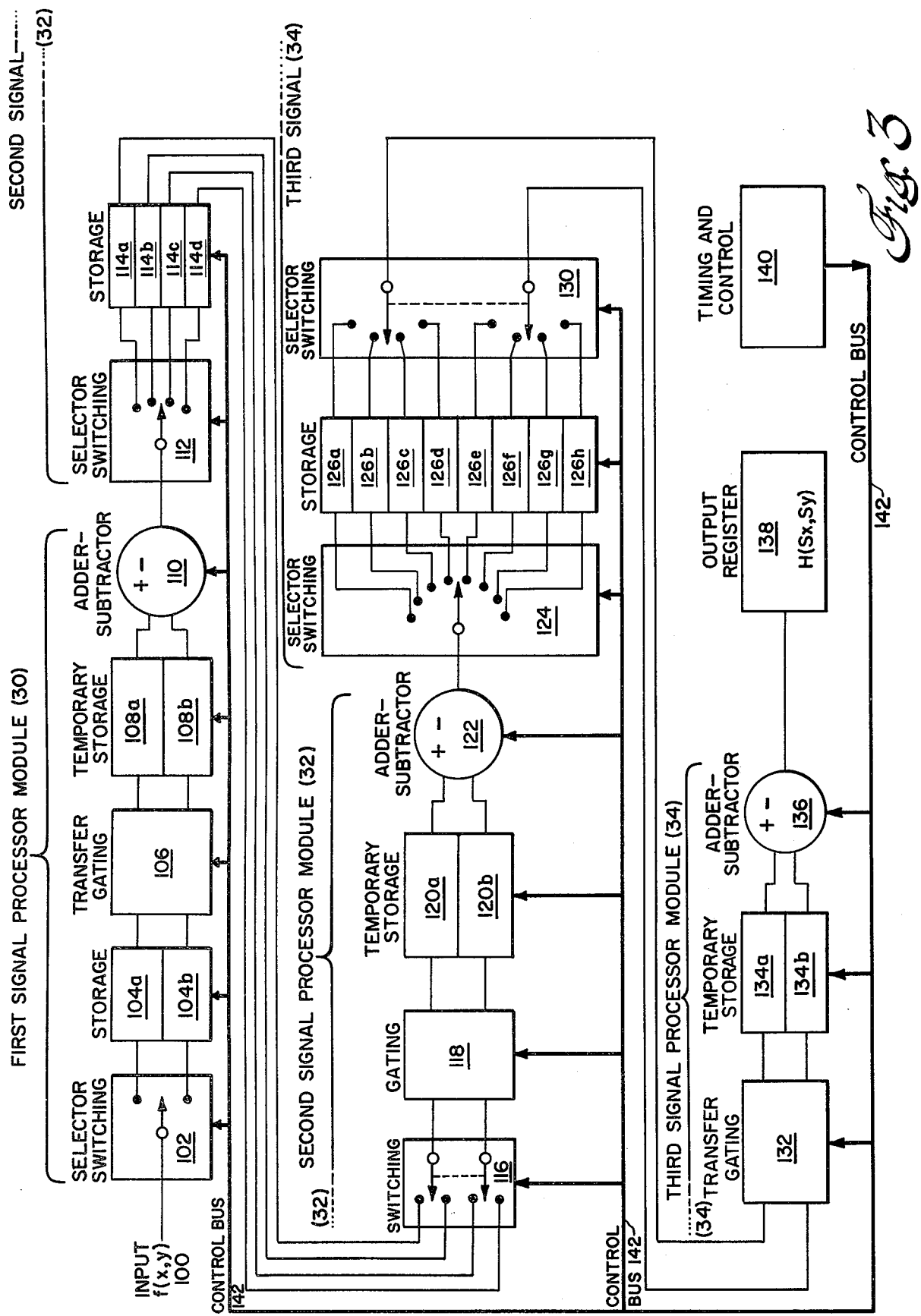
FIG. 3 is a schematic representation of a three stage Walsh transform generator of the present invention.

A preferred embodiment of a transform generator in accordance with the present invention is illustrated schematically in FIG. 3. The components of the generator comprise electrical circuits which are well known in the art and which are indicated in FIG. 3 as functional blocks. The signal paths in FIG. 3 are drawn as single wires, it should be understood, however, that the signal paths may comprise a plurality of wires or may comprise multiplexed data buses of the type which are well known in the computer art.

A stream of serial data $f(x, y)$ 100 is applied to the input of a first signal processor module 30. The signal processor module 30 comprises a selector switch 102 which is connected to receive the input data 100 and to alternately direct samples from that data stream to a pair of storage registers 104a and 104b. The output of storage registers 104a and 104b are connected through transfer gates 106 to a pair of temporary storage registers 108a and 108b, respectively. Thus, upon activation of transfer gates 106, the contents of storage registers 104a and 104b will be respectively transferred to the temporary storage registers 108a and 108b. The outputs of temporary storage registers 108a and 108b are combined in an adder-substractor circuit 110. The adder-subtractor 110 operates under the influence of a control signal to produce an output which is representative of either the arithmetic sum of the contents of register 108a and 108b or of the difference of the contents of register 108b subtracted from the contents of register 108a. The circuits of the first signal processor module 30, selector switch 102, storage registers 104a and 104b, transfer gate 106, temporary storage resisters 108a and 108b and the adder-subtractor 110 function under the influence of control signals which are generated by a timing a control circuit 140 and transmitted to the various circuits over a control bus 142 to serially produce an output from the adder-subtractor 110 which is representative of the sums and differences of the input data samples 100 combined in the manner indicated in the diagram of FIG. 2.

The above-mentioned output of the first signal processor module 30, which may be seen to represent the sequency ordered Walsh transform coefficients of order two of the input 100 data, samples grouped in blocks of two, is applied to the input of a second signal processor module 32. The second signal processor module 32 comprises a selector switch 112 connected to receive the sequential signals from the output of the adder-subtractor 110 in the first signal processor module 30 and to sequentially store those signals in a set of four storage registers 114a, 114b, 114c, and 114d. Signal outputs from the storage registers 114 a–d are applied to the input of a double pole, double throw selector switching circuit 116 which is adapted to alternately produce output signal pairs which are first representative of the contents of the first and third storage registers 114a and 114c and then representative of the contents of the second and fourth storage registers 114b and 114d. The outputs of the selector switch 116 are applied through a transfer gating circuit 118 to the inputs of two temporary storage registers 120a and 120b. The outputs of the temporary storage registers 120a and 120b are applied to an adder-subtractor circuit 122a which functions under the influence of the timing and control circuit 140 to produce an output signal which is representative of either the sum of the contents of the temporary storage registers 120a and 120b or of the difference of the contents of the second temporary storage 120b subtracted from the contents of the first temporary storage register 120a.

The circuits comprising the second signal processing module 32, (the selector switch 112, the storage registers 114a through 114d, the selector switch 116, the transfer gates 118, the temporary storage register 120a and 120b, and the adder-subtractor 112), function under the control of the timing control generator 140 to produce signals at the output of the adder-subtractor 122 which represent the sequential sums and differences of sequential pairs of the order two, sequency ordered Walsh transform coefficients, which are received from the output of the adder-subtractor 110 in the first signal processor module 30, combined in the manner illustrated in FIG. 2. Under the influence of the timing and control circuit 140, the adder-subtractor 122 acts to sequentially produce the sum and the difference of a first pair of transform coefficients followed by the difference and the sum of a second pair of these transform coefficients.

The output of the adder-subtractor 122 may be seen to represent a sequency ordered set of order four Walsh transform coefficients computed from sequential blocks of four samples from the input data stream. These transform coefficients are applied to the input of a third signal processor module 34 from which they are connected to the input of a selector switch 124. Selector switch 124 functions of sequentially route the order four transform coefficients from the adder-subtractor 122 into a set of eight storage registers 126a–126h. The outputs from the storage registers 126a–126h are directed to the inputs of a two-pole four-position selector switch circuit 130 which functions to present two output signals which sequentially represent: the contents of registers 126a and 126e; the contents of registers 126b and 126f; the contents of registers 126c and 126g; the contents of registers 126e and 126h, the contents of registers 126a and 126e .... The outputs of the selector switch 130 are applied through a set of transfer gates 132 to a pair of temporary storage registers 134a and 134b which act to sequentially store each of the above-mentioned signal pairs. The outputs of the temporary storage registers 134a and 134b are applied to the inputs of an adder-subtractor circuit 136 which functions, under the influence of the timing and control generator 140, to sequentially combine the signal pairs, which represent the order four Walsh transforms mentioned above, to produce the order eight sequency ordered, Walsh transform coefficients indicated at the nodes 24a through 24h in FIG. 2.

The individual components of the third signal processor module 34 (that is the selector switch 124, the storage registers 126a through 126h, selector switch 130, the transfer gates 132, temporary storage registers 134a and 134b, and the adder-subtractor 136) function under the influence of the timing control circuit 140, as did the components of the previous signal processor modules 30 and 32 to yield sequency ordered Walsh transform coefficients which may be stored, if desired, in an output register 138.

The order eight sequency ordered Walsh transform coefficients represent the output of the three-stage circuit used as an illustration of a preferred embodiment of the present invention. It is to be understood, however, that the output of the adder-subtractor 136 could, if desired, to applied to additional signal processor modules, constructed in the same manner as the second signal processor module 32 and the third signal processor module 34 but containing additional switch positions and storage registers, to produce Walsh transform coefficients of order 16 or more.

The functions of the Walsh transform coefficient generator of FIG. 3 may be understood by reference to FIG. 4, which is a timing diagram indicating the sequence of operation of the functional blocks of FIG. 3, and by reference to FIGS. 5a through 5j which indicate the states of registers and switches in the generator of FIG. 3 at clock cycle times which may be identified by reference to FIG. 4.

The progress of a representative eight sample input data block through the Walsh function coefficient generator of FIG. 3 is described with reference to those entries in the table of FIG. 4 lying above the heavy line A—A. The functional operations described in the table of FIG. 4 which lie below the heavy line A—A relate to the processing of other eight sample data blocks and although included in that table for completeness will not be described in detail. The columns of the table in FIG. 4 correspond to the states of the Walsh transform generator at sequential clock cycles which are identified by the Roman numerals I through XVIII. A new sample of the input data arrives synchronously with the start of each clock cycle.

The arithmetic values of each of the eight samples of the representative input data block are indicated in the drawings of FIG. 5a through 5j by numerals 1 through 8, the numerical values of each of the samples of the next eight sample data block received by the generator are indicated by the numerals 1' through 8' in those figures.

Figure 5A:
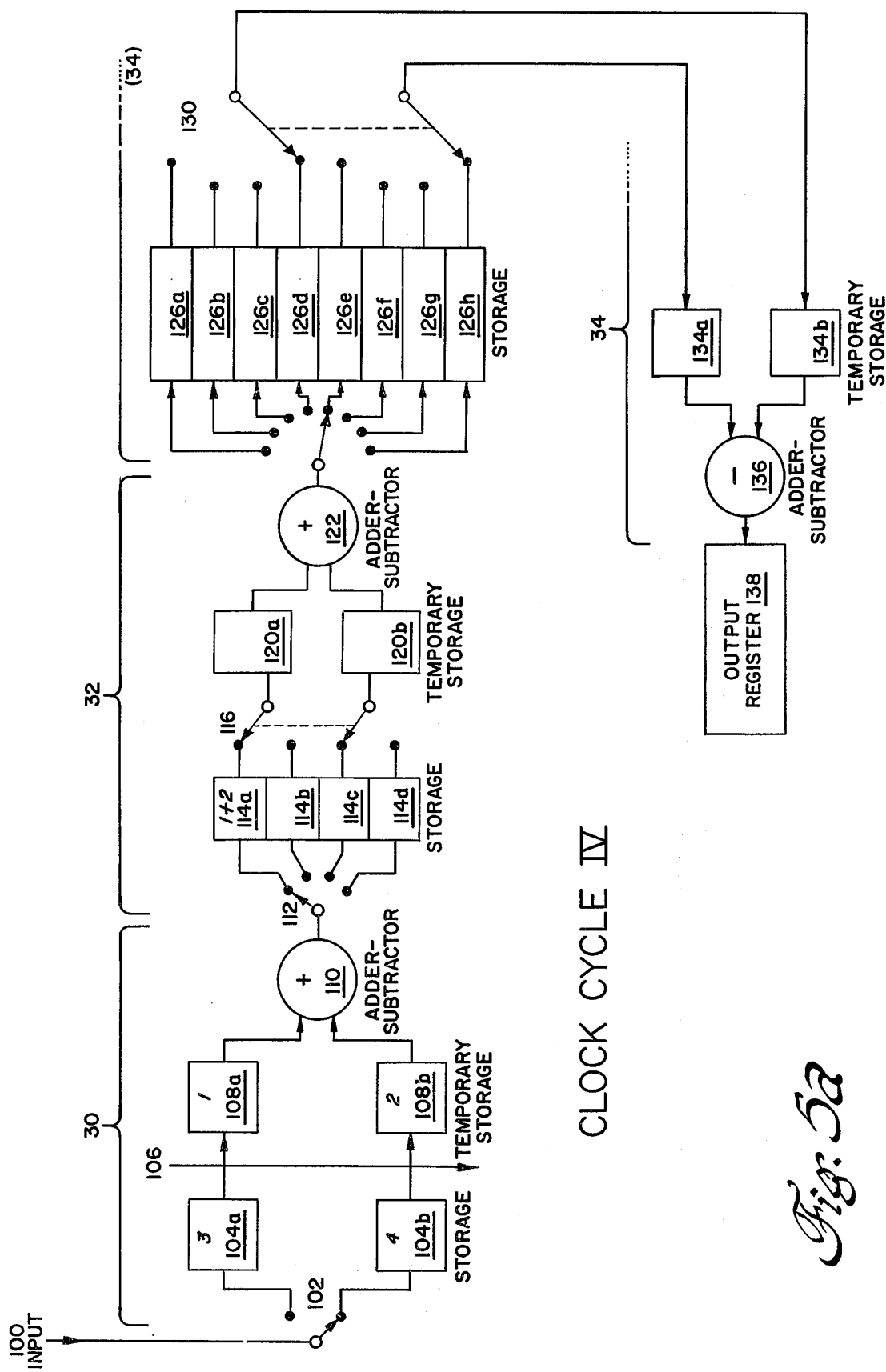

During cycles I and II, the first two samples of the data, 1 and 2 appear sequentially at the input of the transform generator and are routed into the registers 104a and 104b, respectively. During cycle III, the contents of the registers 104a and 104b are respectively transferred to the temporary storage registers 108a and 108b; at the same time the input sample 3 is routed to the register 104a and stored therein. During cycle IV date sample 4 is stored in the register 104b while the contents of the temporary storage registers 108a and 108b are summed in the adder-subtractor 110 to produce an output equal to the sum of 1 + 2; this sum is directed to and stored in the register 114a. The contents of the registers 104, 108, and 114 following clock cycle IV are illustrated in FIG. 5a.

Figure 5B:
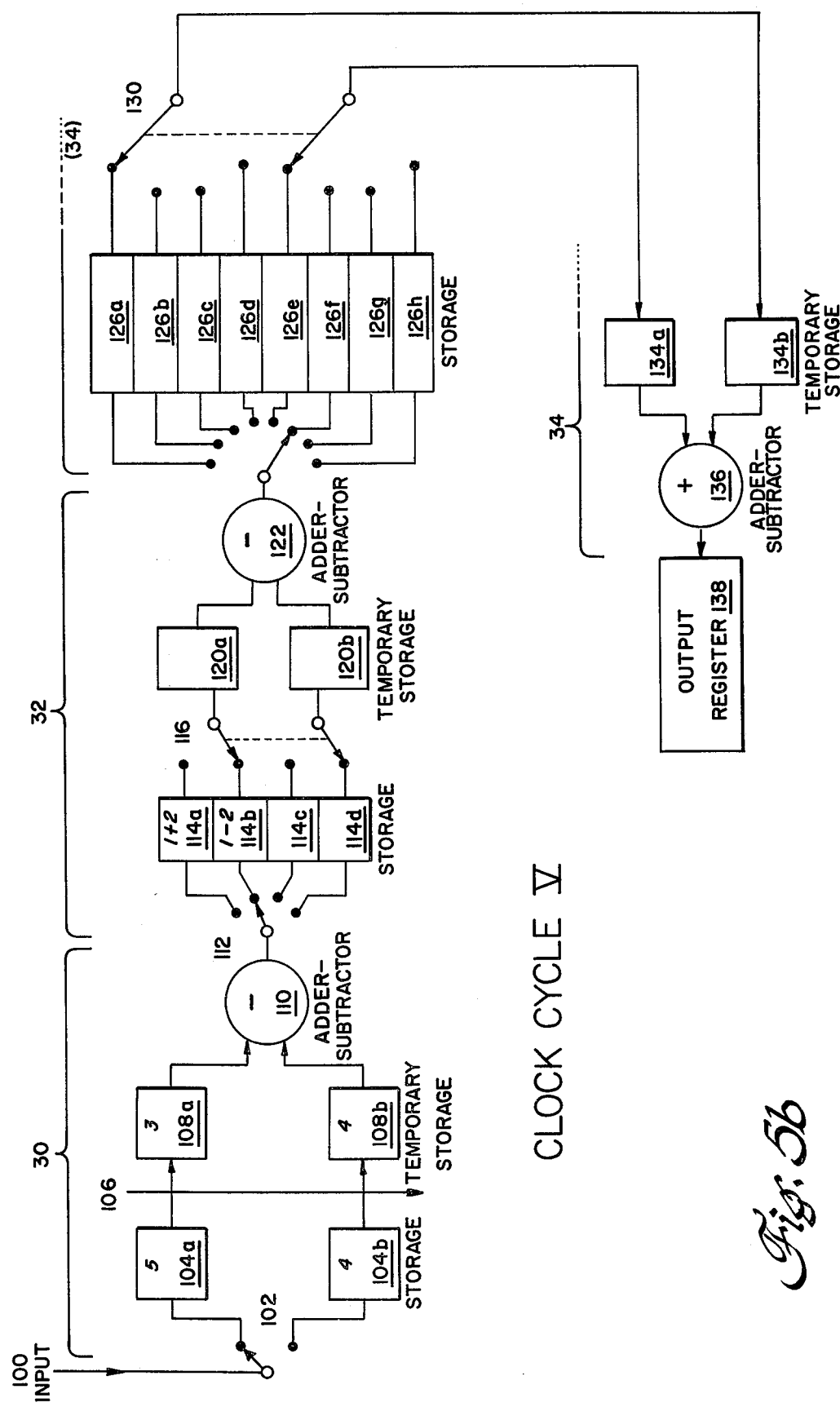

During cycle V the adder-subtractor 110 functions to produce a signal equal to the numerical difference of 1–2; this difference is directed to and stored in the register 114b. At the same time data samples 3 and 4 are transferred from the registers 104a and 104b to the registers 108a and 108b, respectively. Data sample 5 is received at the circuit input and stored in the register 104a. The contents of the registers 104, 108, and 114a and 114b, and the circuit states following clock cycle V are illustrated in FIG. 5b.

Figure 5C:
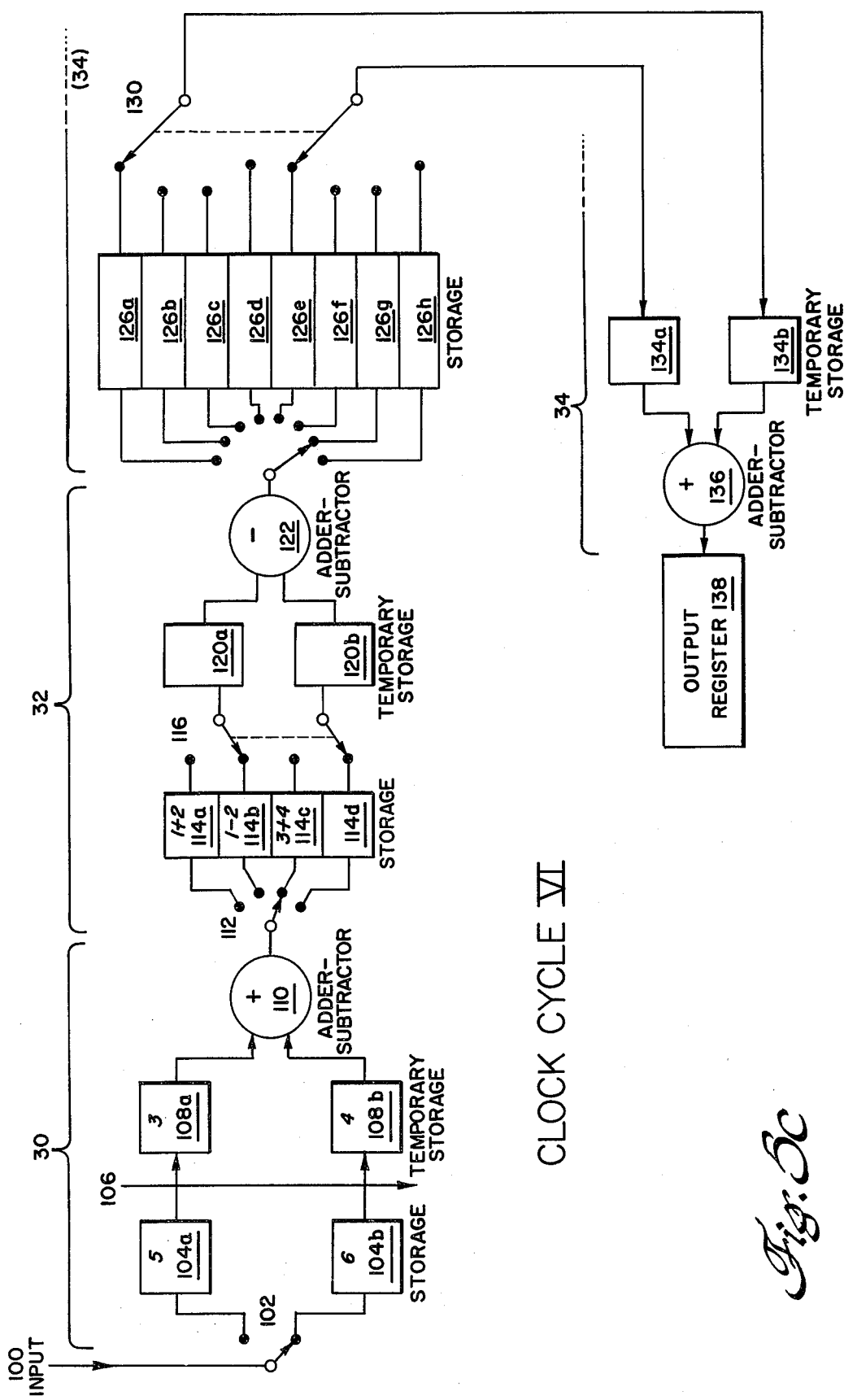

In a similar manner, during cycle VI, the sum of data sample 3 + 4 is calculated from the contents of the registers 108a and 108b by the adder-subtractor 110 and is stored in the register 114c. The contents of these registers and the states of the transform generator following clock cycle VI are illustrated in FIG. 5c.

Figure 5D:
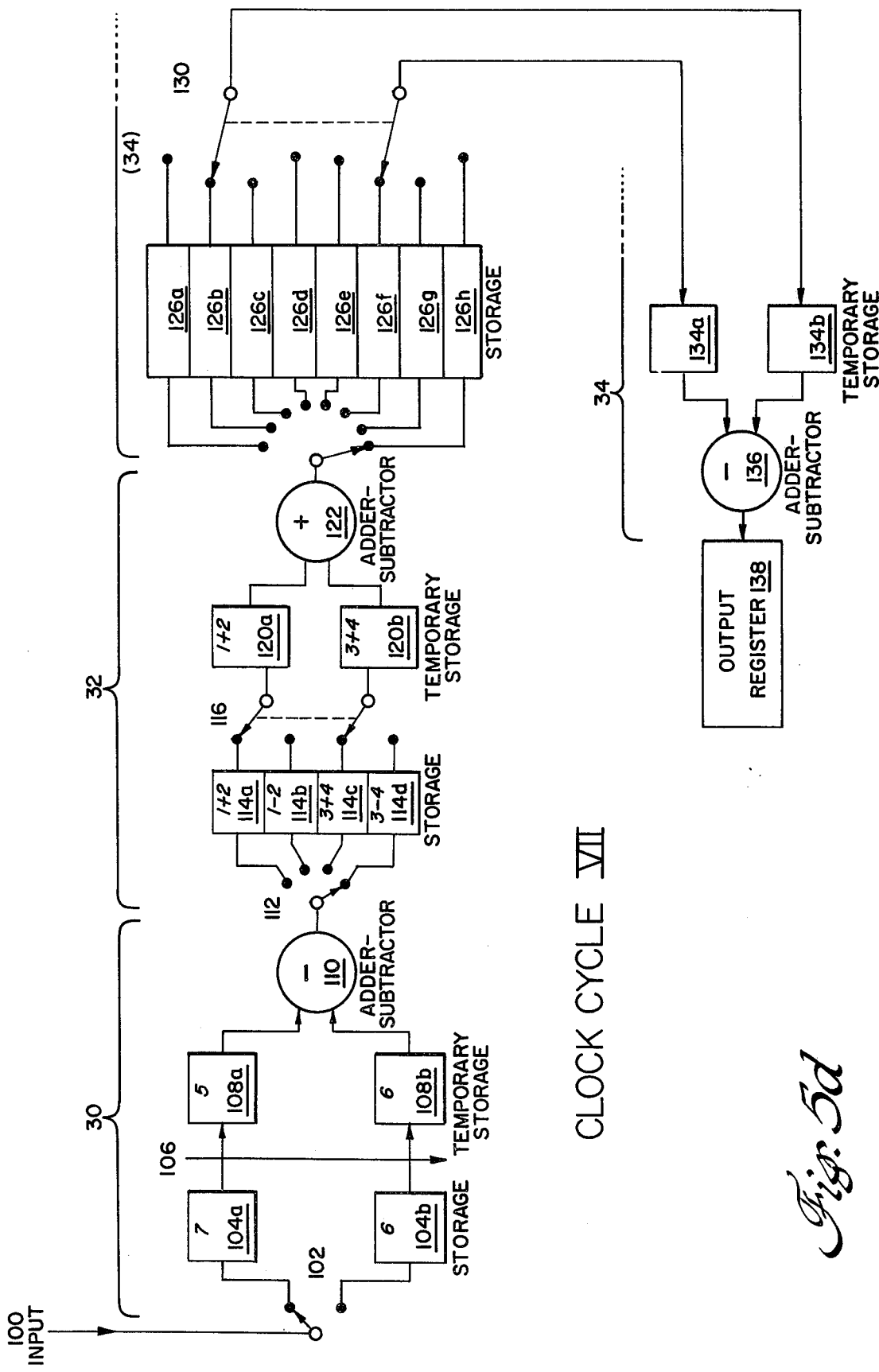

The generator continues to receive input data samples and, in the manner described in the preceding paragraphs, to sequentially compute the sums and differences of data sample pairs which are stored in the registers 114a through 114d. During clock cycle VII, the register 114a contains the sum of data samples 1 + 2. While register 114c contains the sum of data samples 3 + 4. The contents of these registers are transferred, during cycle VII, to the storage registers 120a and 120b, respectively. The flow of data through the transform generator at the end of cycle VII is illustrated in FIG. 5d. The contents of registers 114a through 114d may be seen, at this point, to comprise the order two, sequency ordered, Walsh transform coefficients of the first four samples (1, 2, 3, and 4) of the input data 100 sequence, taken two samples at a time.

Figure 5E:
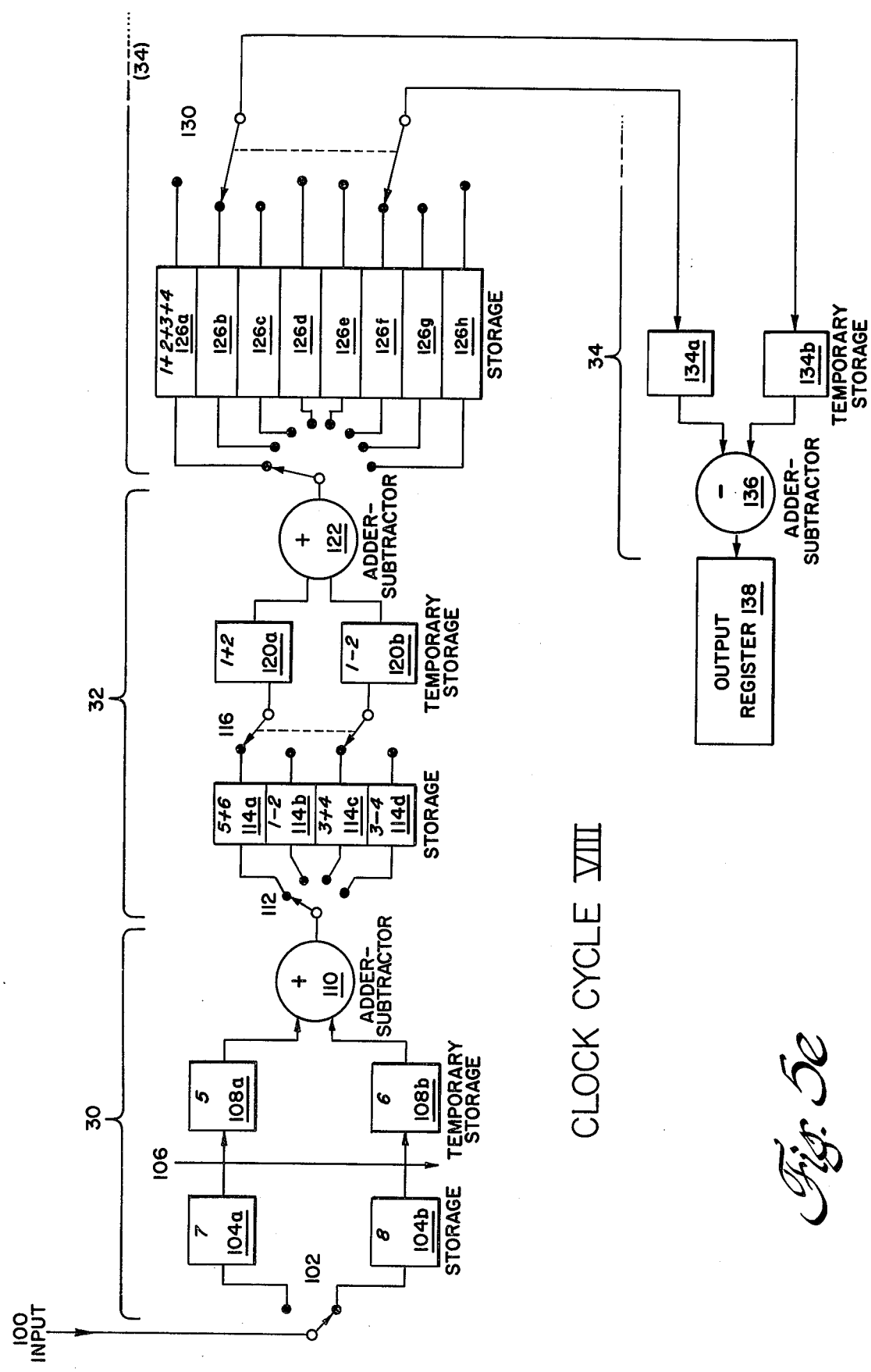

During clock cycle VIII the sequential processing of input data continues. The adder-subtractor 110 produces an output equal to the sum of data samples 5 and 6 which is stored in register 114a replacing the value of data sample 1 and data sample 2. At the same time the contents of the registers 120a and 120b are summed in the adder-subtractor 122 to produce a signal equal to the sum of the first four data samples 1 + 2 + 3 + 4); this sum is stored in the register 126a. The flow of information through the transform generator at the end of clock cycle VIII is illustrated in FIG. 5e.

During clock cycle IX the first data sample of the next eight sample block 1', is received and directed into the register 104a. The sequential processing of the first block of data samples continues; the difference of data samples 5–6 is stored in register 114b while the difference of the contents of the registers 120a and 120b: that is, data samples (1 + 2)–(3 + 4) is stored in the register 126b. At the same time the contents of the registers 114b and 114d: that is the difference of data samples 1–2 and the difference of data samples 3–4 are transferred to the temporaray storage registers 120a and 120b. The flow of data following clock cycle IX is illustrated in FIG. 5f.

Figure 5G:
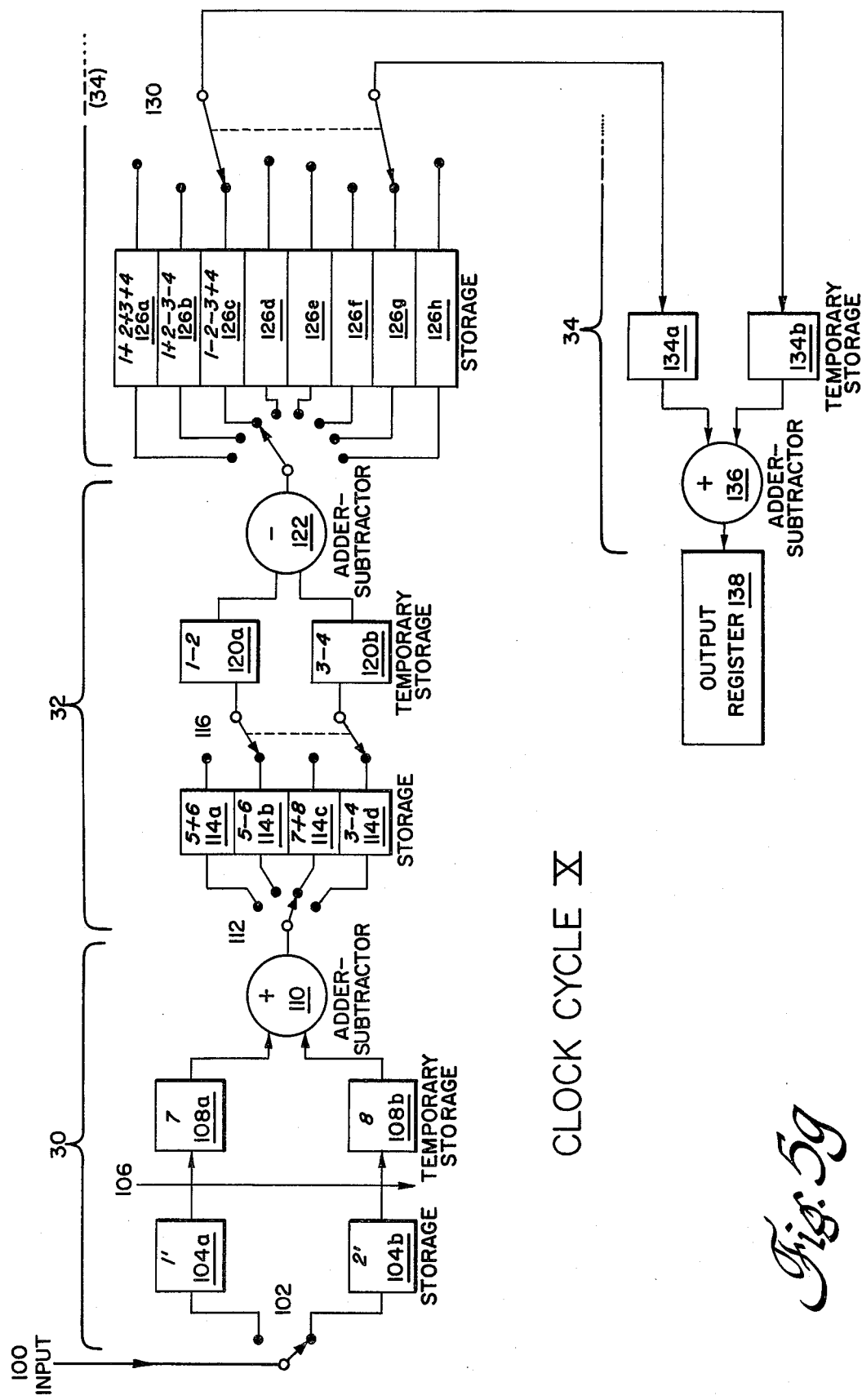

During clock cycle X the difference of the contents of the registers 120 a and 120b is computed in the adder-subtractor 122 and stored in the registers 126c. The processing of input data samples continues in pipeline fashion, described above, in the earlier stages. The flow of data at the end of clock cycle X is illustrated in FIG. 5g.

The processing of data samples continues in the cyclic fashion illustrated above. During cycle clock XI the contents of the registers of 120a and 120b are added in the adder-subtractor 122 and the sum is stored in register 126d. It may be seen, by reference to the table of FIG. 4, that the adder-subtractor 122 sums the contents of the register 120a and 120b during the sequential data cycles and then takes the difference of the contents of registers 120a and 120b during the next two sequential data cycles. At the end of clock cycle XI, the contents of registers 126a through 126h may be seen, by reference to the data flow diagrams of FIG. 5, to constitute the order four sequency ordered, Walsh transforms of the input data samples taken four at a time.

Figure 5H:
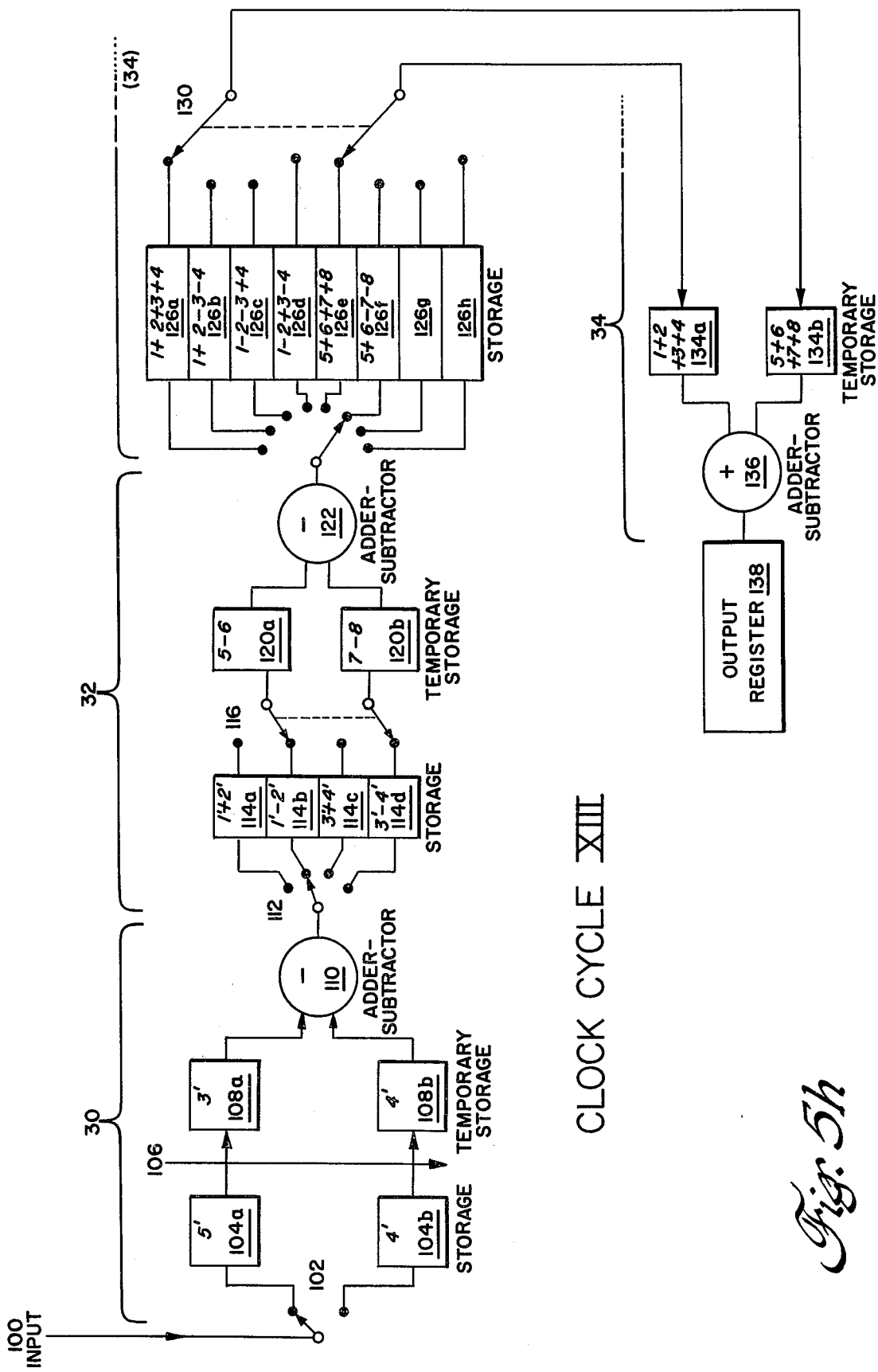

The sequential processing of data samples continues in like manner. During clock cycle XIII the contents of register 126a: 1 + 2 + 3 + 4 (that is the first sequency ordered Walsh transform of data samples 1 through 4) and the contents of register 126e, 5 + 6 + 7 + 8: (the first sequency ordered Walsh transform of data samples 5 through 8) are transferred to the temporary storage registers 134a and 134b, respectively. The flow of data following clock cycle XIII is illustrated in FIG. 5h.

During clock cycle XIV (FIG. 5i) the contents of the temporary storage registers 134a and 134b are summed in the adder-subtractor 136. The output of the adder-subtractor 136 is equal to the sum of data samples 1 through 8 and may be seen to equal the first sequency ordered Walsh transform of the data samples 1 through 8 taken eight at a time: that is $$W(o, t) = 1 + 2 + 3 + 4 + 5 + 6 + 7 + 8 \qquad (3)$$

The sequential processing of input data signals continues in cycle XV (FIG. 5j) at which time the contents of register 134b $(5 + 6 + 7 + 8)$ are subtracted from the contents of register 134a $(1 + 2 + 3 + 4)$ by the adder-subtractor 136. The output of the adder-subtractor 136 following clock cycle XV may be seen to equal data samples $1 + 2 + 3 + 4 - 5 - 6 - 7 - 8$. The output from the adder-subtractor 136 following cycle XIV may, therefore, be seen to equal the second sequency ordered, order 8, Walsh transform of the eight sample input data sequency: $wal(l, t)$ The adder-subtractor 136 functions in a sequence similar to that of the adder-subtractor 122 to produce alternate sets of two sums followed by two sets of differences from the data in registers 134a and 134b. The function of the second signal processor module 32 and of the third signal processor module 34 may be seen to be identical, only the number of storage registers in each module varies. Higher order Walsh transform coefficients may be produced from the output of the adder-subtractor 136 by cascading additional stages of signal processor module in the manner indicated with respect to the second signal processor module 32 and the third signal process module 34. As indicated in the timing diagram of FIG. 4, the adder-subtractor 110 in the first signal processor module 30 alternately takes the sum of its inputs and the difference of its inputs on sequential clock cycles. The function of the adder-subtractor 110 may be controlled by a square wave $Q_o$ which alternates state at each clock cycle.

The adder-subtractors 122 and 136 in the higher order modules 32 and 34 alternately take pairs of sums and pairs of differences on sequential pairs of clock cycles. Those adder-subtractors (i.e., 136) in higher odd-ordered modules $i = 3, 5, 7 \ldots$ of a generator of the present construction will sum when those adder-subtractors in even-ordered modules $i = 2, 4, 6 \ldots$ will subtract. The adder-subtractors in even-ordered modules may thus be controlled by a square wave $Q_1$ having a period of four clock cycles while the adder-subtractors in higher odd-ordered modules may be controlled by $\overline{Q_1}$, the complement of $Q_1$.

It will be noted that upon filling of this Walsh transform generator, a continuous stream of sequency ordered Walsh transform coefficients are in generated in the output register 136.

Figure 6:
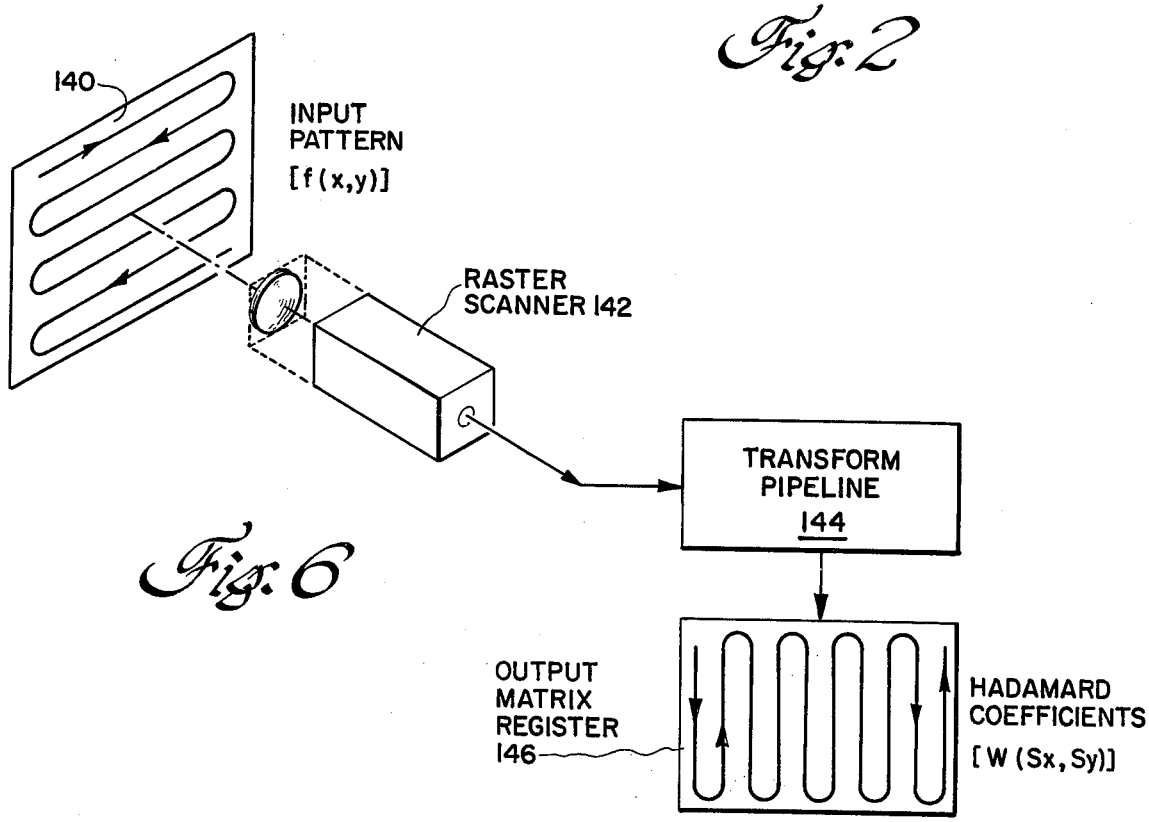
FIG. 6 illustrates an optical scanning system incorporating the pipeline Walsh transform generator of the present invention.

The Walsh transform generator of the present invention may be utilized to process binary pattern or grey scale information. This process is illustrated in FIG. 6 where a raster scanner 142 sequentially scans a binary input pattern 140. The order of scan may be seen to be row sequential, the first row being scanned left to right and the direction of the scan alternating with sequential rows. The output of the raster scanner 142 is applied to a Walsh-Hadamard pipeline generator 144 which is constructed in the manner illustrated in FIG. 3 and which contains sufficient signal processor modules to generate Walsh transform coefficients having the same order as the binary input pattern 140. The output of the pipeline transform generator 144 may be seen to comprise a Walsh matrix $$[Wal(S_x, S_y)];$$

the elements of this Walsh transform matrix are produced in column sequential order starting at the upper left corner, proceeding down the first row, up the second row and continuing sequentially down and up alternate rows.

It may, therefore, be seen that the present invention provides a machine for generating transform coefficients in a continuous, sequency ordered, manner from an input data stream. The invention may be constructed using readily available electronic components and circuits, is fast, efficient, and produces output data which may be readily filtered or processed in pattern recognition machinery and many other signal processing applications. The generator is modular in form and may, by the addition of identically configured stages of increasing size, be expanded to produce transform coefficients of any dimension.

While the invention has been described in detail herein in accord with certain embodiments thereof, many modifications and changes therein may be effected by those skilled in the art. Accordingly, it is intended by the appended claims, to cover all such modifications and changes as fall within the true spirit and scope of the invention.

The invention claimed is:

1. A machine for receiving an input sequence signal of serial, data samples, there being $2^p$ signals in each sequence, and for producing therefrom a serial output signal representative of the sequency ordered coefficients of a binary, orthogonal transform of said input data signals, comprising in combination:

a. an ordered set of $p$ signal processing modules, each of said processing modules having an associated order number $i$ ($i = 1, p$), each of said modules further having a signal input port, a signal output port, and control input ports; said modules being connected in an ordered cascade, wherein said input sequence signal is applied to said signal input port of the first ordered of said modules and said output signal is received from said signal output port of the $p^{th}$ ordered of said modules, each of said signal processor modules further comprising:

an ordered set of $2^i$ signal storage elements, where $i$ represents the order number of said signal processor module, said storage elements being organized as a first ordered subset comprising the $2^{i-1}$ lowest ordered storage elements of said set and a second ordered subset comprising the $2^{i-1}$ highest ordered storage elements in said set;

switching means connected for sequentially applying signals from said input port to each of said storage elements in said ordered set in order and in response to signals from said control ports;

arithmetic circuit means, connected for sequentially receiving pairs of signals from pairs of said storage elements, said pairs of said storage elements including correspondingly ordered storage elements taken from said first subset and from said second subset, and for producing therefrom, at the output port of said signal processor module and in response to signals from said control port, a sum signal representative of the sum of said pair of signals and a difference signal representative of the difference of said pair of signals;

b. control means connected for providing a plurality of control signals to the control signal ports of each of said signal processor modules, said control signals being connected to induce said arithmetic means to sequentially produce said sum signals and said difference signals from each of said received pairs of signals whereby said signals transform coefficients of said input sequence of data signals are extracted.

2. The machine of claim 1 wherein said control means are further connected to induce said arithmetic circuit means in said first ordered module to sequentially produce said sum and said difference signal from each of said received signal pairs.

3. The machine of claim 2 wherein said control means are further connected to induce each of said arithmetic circuit means in each of said modules having an order number, $i$ being equal to or greater than 2, to sequentially produce said sum signals and said difference signals from a first received signal pair and said difference signals and said sum signals from a next received signal pair.

4. The machine of claim 3 wherein said control means are further connected to induce said signal processor modules to operate synchronously in response to a periodic clock signal.

5. The machine of claim 4 wherein said control means are further connected to induce each of said arithmetic circuit means in each of said signal processor modules having even order numbers, , to produce a sum signal at such times as each of said arithmetic circuit means in each of said signal processor modules having odd order numbers, , $i$ being greater than 1, produce a difference signal.

6. The machine of claim 5 wherein said plurality of control signals comprise a first square wave having a period equal to twice the period of said periodic clock signal, said first square wave being applied to a control port of said first signal processor module.

7. The machine of claim 6 wherein said plurality of control signals comprise a second square wave having a period equal to four times the period of said periodic clock signal, said second square wave being applied to the control ports of said processor modules of even order number, .

8. The machine of claim 7 wherein a complement wave of said second square wave is applied to the control ports of said signal processor modules having odd order numbers, $i$, $i$ being greater than 1.

9. The machine of claim 8 wherein said input sequence signal comprises eight samples; said ordered set of signal processor modules comprises three signal processor modules, the first of said processor modules comprises two of said storage elements, the second of said processor modules comprises four of said storage elements, and the third of said processor modules comprises eight of said storage elements; and wherein said arithmetic circuit means in said third module produce said sum signals at such times as said arithmetic circuit means in said second module produce said difference signals.

10. The machine of claim 1 wherein said storage elements are analog sample-and-hold circuits.

11. The machine of claim 10 wherein said arithmetic circuit means are operational amplifiers.

12. The machine of claim 1 wherein said storage elements are digital storage means.

13. The machine of claim 12 wherein said arithmetic circuit means are digital logic circuits.

14. The machine of claim 1 wherein each of said arithmetic circuit means further comprise two temporary storage elements connected for receiving and temporarily storing the values of one of said signal pairs.

15. A machine for sequentially receiving $2t$ sample blocks of an input signal representative of the values of the order $t$, sequency ordered Walsh transform coefficients of successive $t$ sample blocks of a data set and for extracting therefrom serial output characters representative of the values of the successive, order $2t$, sequency ordered Walsh transform coefficients of sequential, $2t$ sample blocks of said data set; wherein $t = 2^n$, $n$ being an interger; comprising in combination:

a first storage register comprising $t$ ordered data storage elements;

a second storage register comprising $t$ ordered data storage elements;

input switching means, connected for receiving said input signal and for transferring the values of a first block of said input samples, in order, into the ordered elements of said first storage register and for transferring the values of a next block of said input samples, in order, into the ordered elements of said second storage register; and arithmetic circuit means connected for sequentially receiving values from said ordered elements from said first storage register and for pairing said values with values received from storage elements of corresponding order in said second storage register and for sequentially producing signals representative of the sums and of the differences of said value pairs whereby said sequency ordered transform coefficients are extracted.

16. The machine of claim 15 wherein said arithmetic means is further connected for successively producing said sum signal and said difference signal from said pair of values received from a first ordered pair of said storage elements and for successively producing said difference signal and said sum signal from a pair of said values received from a next ordered pair of said storage elements.

17. The machine of claim 15 wherein said storage elements comprise binary data storage means and wherein said arithmetic means comprise digital logic circuits.

18. The machine of claim 17 wherein each of said samples consists of one data bit.

19. The machine of claim 15 wherein said storage elements comprise analog sample-and-hold circuits and said arithmetic means comprise operational amplifiers.

20. The machine of claim 15 wherein $t$ equals 2.

21. The machine of claim 15 wherein $t$ equals 4.

* * * * *

UNITED STATES PATENT OFFICE
CERTIFICATE OF CORRECTION

Patent No. 3,956,619  Dated May 11, 1976

Inventor(s) Joseph L. Mundy, et al

It is certified that error appears in the above-identified patent and that said Letters Patent are hereby corrected as shown below:

Column 12, claim 1, line 46, delete "$2^{i-1-}$" and substitute therefor -- $2^{i-1}$ --

Column 13, claim 3, line 12, after "number" insert -- , i --

Column 13, claim 5, line 25, after "numbers," insert -- i --

Column 13, claim 5, line 28, after "numbers," insert -- i --

Signed and Sealed this

Seventh Day of September 1976

[SEAL]

Attest:

RUTH C. MASON
*Attesting Officer*

C. MARSHALL DANN
*Commissioner of Patents and Trademarks*